Aug. 20, 1929.  G. B. JONES  1,724,940
FLUSH VALVE
Filed Sept. 19, 1927
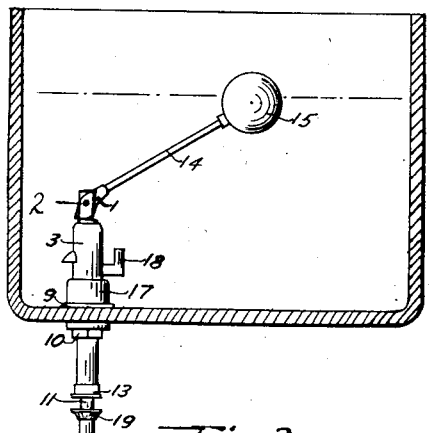
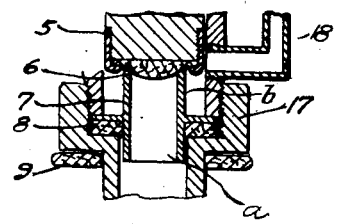
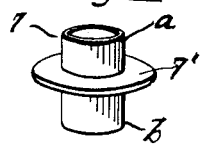
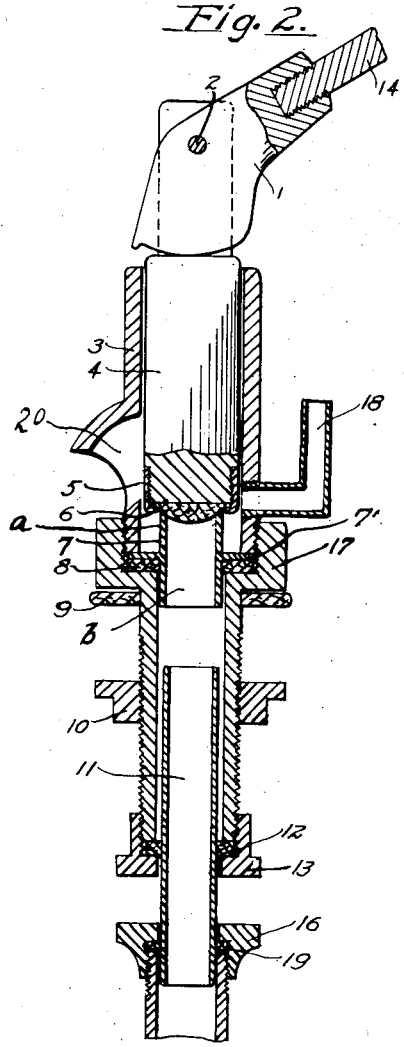
George B. Jones INVENTOR
By *his attorney*

Patented Aug. 20, 1929.

1,724,940

UNITED STATES PATENT OFFICE.

GEORGE B. JONES, OF LOS ANGELES, CALIFORNIA.

FLUSH VALVE.

Application filed September 19, 1927. Serial No. 220,488.

This invention relates to a flush valve of the type employed in flush tanks of toilets and the like and more particularly pertains to an improved construction in the valve seat.

An object of the invention is to provide a valve seat for flush valves which is adapted to be adjusted to compensate for wear of the valve gasket so as to attain greater length of service of such gasket, thereby rendering less frequent necessity of renewal and replacement of the gasket.

Another object is to provide a valve seat for flush valves which may be readily removed and replaced and which is extremely simple in construction and economical in manufacture.

With the foregoing objects in view together with such other objects and advantages as may subsequently appear, the invention resides generally in the provision of a tubular valve seat having an external flange spaced differentially from the opposite ends of the tube, whereby a relatively short end portion and a relatively long end portion are formed on the opposite sides of the flange so as to permit the tube being disposed in a seated position on its flange with either the shorter or the longer end portion uppermost.

The invention further resides in the parts and in the combination, construction and arrangement of parts hereinafter described and claimed and illustrated by way of example in the accompanying drawings in which:

Fig. 1 is a cross sectional view of a tank showing the flush valve in place and as viewed in side elevation;

Fig. 2 is a detail in cross section of the flush valve showing the demountable valve seat as positioned with its shorter barrel end uppermost;

Fig. 3 is a fragmentary view in cross section showing the valve seat as disposed with the longer barrel end uppermost;

Fig. 4 is a perspective view of the valve seat.

Referring to the drawings more specifically, 1 indicates a rocker lever pivotally supported on a pivot pin 2 carried by a pair of yoke members formed on the upper end of a cylindrical valve housing 3. Reciprocally mounted within the housing 3 is a piston 4, the upper end of which abuts against a cam face formed on the lower end of the rocker lever 1 and on the lower end of which valve is screwed a flange collar 5 by which a gasket 6 constituting the valve face is affixed to the lower end of the valve. Said cam face being formed to produce a diminishing throw.

7 designates a valve seat which embodies a cylindrical tube formed with an external annular flange 7′, which flange is spaced differentially from the opposite ends of the tube so as to form the tube with a relatively short barrel portion A projecting from one side of the flange and a relatively long barrel portion B projecting from the other side thereof.

The valve seat 7 is designed to be positioned with the flange 7′ seating on a gasket 8 resting on a shoulder within a lower extension 17 of the cylindrical valve housing 3 and attached to the latter by a threaded joint. A gasket 9 and a lock washer 10 are mounted on the valve housing extension for engagement with the walls of the tank through which the extension is passed in the usual manner and carried by the extension is a tube 11 constituting a slip joint which tube is affixed to the extension by the usual gasket 12 and sleeve 13 of a packing gland. The lower end of the tube 11 connects with a supply pipe through the medium of a gasket 19 and sleeve 16 of a packing gland in the usual manner.

The rocker lever 1 is formed with an arm 14 on the outer end of which is mounted a float 15, the valve housing is provided with an upwardly opening outlet 18 and a downwardly opening outlet 20 which communicates with the interior of the housing adjacent the lower end of the valve 4.

In the operation of the invention the valve 4 is lifted by water pressure from the source of supply when the arm 14 is disposed in such lowered position that the cam face of the rocker lever clears the upper end of the valve whereupon water flows through the valve seat around the valve and into the tank through the outlets 18 and 20. As the level of the water in the tank raises and lifts the float 15, the valve is caused to move with diminishing speed to its seat under the action of the cam face of the rocker lever so as to cut off the flow of water to the tank when the gasket 16 seats on the upper end of the valve seat 2 as shown in Fig. 2. Upon initial installation of the valve seat as when the gaskets 6 and 8 are new, it is disposed with the short barrel end thereof uppermost as shown in Fig. 2. When the gaskets 6 and 8 become so worn as to not permit proper seating of the valve under action of a cam, the valve housing 3 is unscrewed from its connection with the extension 17 and the valve seat 7 is inverted to prevent the longer barrel end thereof uppermost as shown in Fig. 3, thus disposing the valve seat on a higher plane so that the valve will then properly seat, when the valve has been reassembled and set in operation.

When water in the tank or other receptacle, has risen or filled to the required level, the valve automatically closes and locks itself.

After closing of the valve, pressure is entirely relieved from float ball and rod 15 and 14, due to the rotation of the cam having brought the point of pressure application on the piston nearer the direct line of force between the bearing point of said cam and the line of travel of said piston.

The rod and float ball is only necessary to close the valve, and to rotate the cam I, after which the cam acts as a lock against opening under any pressure.

When water has been drawn from the tank, relieving the piston from overhead pressure, the piston is raised by the force of water pressure and the valve is opened to refill the tank.

The cam I, and piston 4, are thus capable of handling high or low pressure as required, without any adjustment.

When the tank is empty the water raises the piston 4, considerably above the seat and permits the water to enter a large chamber thereby causing a free and noiseless flow of water.

The only readjustment needed is a new washer on the lower end of the piston 4, and in time, a reversal of the valve seat.

The cylindrical valve seat illustrated in Fig. 4 is reversible and adjustable, and can be replaced readily and easily whenever required.

I claim:

1. In a flush valve, a valve casing, a float controlled valve therein, and a demountable tubular valve seat formed with an external annular flange differentially spaced from the opposite ends of the tubular valve seat adapted to be supported in the valve casing with either end of the tubular valve seat presented to the valve.

2. In a flush valve, a demountable and invertible valve seat consisting of a cylindrical tube open at each end and both ends of which constitute valve seats, and an outwardly projecting annular flange on said tube differentially spaced from the ends thereof for the purpose specified.

3. In a flush valve, a valve seat embodying a flange adapted to be supported in a valve casing, and a relatively long and a relatively short tubular extension projecting from the opposite sides of the flange, the ends of which constitute valve seats and either of which may be presented to a valve as specified.

In testimony whereof, I have affixed my signature.

GEORGE B. JONES.